US011663133B2

(12) United States Patent
Ray et al.

(10) Patent No.: US 11,663,133 B2
(45) Date of Patent: May 30, 2023

(54) MEMORY TIERING USING PCIE CONNECTED FAR MEMORY

(71) Applicant: Micron Technology, Inc., Boise, ID (US)

(72) Inventors: Anirban Ray, Santa Clara, CA (US); Paul Stonelake, San Jose, CA (US); Samir Mittal, Palo Alto, CA (US); Gurpreet Anand, Pleasanton, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/824,685

(22) Filed: May 25, 2022

(65) Prior Publication Data

US 2022/0283949 A1 Sep. 8, 2022

Related U.S. Application Data

(63) Continuation of application No. 16/539,139, filed on Aug. 13, 2019, now Pat. No. 11,379,373.

(51) Int. Cl.
*G06F 12/0868* (2016.01)
*G06F 13/28* (2006.01)
(Continued)

(52) U.S. Cl.
CPC ........ *G06F 12/0868* (2013.01); *G06F 3/0604* (2013.01); *G06F 3/068* (2013.01);
(Continued)

(58) Field of Classification Search
CPC .... G06F 3/0604; G06F 3/0653; G06F 3/0659; G06F 3/068; G06F 12/0868;
(Continued)

(56) References Cited

U.S. PATENT DOCUMENTS 5,269,013 A   12/1993  Abramson et al.
9,811,276 B1  11/2017  Taylor
(Continued)

FOREIGN PATENT DOCUMENTS

KR    10-2017-005463 A    5/2017

OTHER PUBLICATIONS

International Search Report and Written Opinion for the International Application No. PCT/US2020/045803, dated Oct. 27, 2020, 11 pages.

*Primary Examiner* — Eric T Oberly
(74) *Attorney, Agent, or Firm* — Lowenstein Sandler LLP

(57) ABSTRACT

A processing device in a host system monitors a data temperature of a plurality of memory pages stored in a host-addressable region of a cache memory component operatively coupled with the host system. The processing device determines that a first memory page of the plurality of memory pages satisfies a first threshold criterion pertaining to the data temperature of the first memory page and sends a first migration command indicating the first memory page to a direct memory access (DMA) engine executing on a memory-mapped storage component operatively coupled with the cache memory component and with the memory-mapped storage component via a peripheral component interconnect express (PCIe) bus. The first migration command causes the DMA engine to initiate a first DMA transfer of the first memory page from the cache memory component to a host-addressable region of the memory-mapped storage component.

20 Claims, 7 Drawing Sheets

(51) Int. Cl.
  *G06F 3/06*    (2006.01)
  *G06F 13/16*   (2006.01)
  *G06F 13/42*   (2006.01)

(52) U.S. Cl.
  CPC .......... *G06F 3/0653* (2013.01); *G06F 3/0659* (2013.01); *G06F 13/1668* (2013.01); *G06F 13/28* (2013.01); *G06F 13/4282* (2013.01); *G06F 2213/0026* (2013.01)

(58) Field of Classification Search
  CPC .. G06F 13/1668; G06F 13/28; G06F 13/4282; G06F 2213/0026
  See application file for complete search history.

(56) References Cited

U.S. PATENT DOCUMENTS

| | | |
|---|---|---|
| 10,164,829 B1 | 12/2018 | Watson et al. |
| 10,268,395 B1 | 4/2019 | Joshua et al. |
| 2007/0288692 A1 | 12/2007 | Bruce et al. |
| 2010/0281230 A1 | 11/2010 | Rabii et al. |
| 2011/0167236 A1* | 7/2011 | Orikasa .................. G06F 3/0689 711/E12.002 |
| 2011/0219150 A1 | 9/2011 | Piccirillo et al. |
| 2012/0072652 A1 | 3/2012 | Celis et al. |
| 2013/0124844 A1 | 5/2013 | Baratam et al. |
| 2013/0212345 A1* | 8/2013 | Nakajima .............. G06F 3/0619 711/161 |
| 2014/0331004 A1 | 11/2014 | McHale et al. |
| 2015/0012690 A1 | 1/2015 | Bruce et al. |
| 2016/0098356 A1 | 4/2016 | Shiu |
| 2017/0039000 A1 | 2/2017 | Feng et al. |
| 2018/0046378 A1 | 2/2018 | Coburn et al. |
| 2018/0059966 A1 | 3/2018 | Lee et al. |
| 2018/0253468 A1* | 9/2018 | Gurajada ............ G06F 16/2255 |
| 2018/0336133 A1 | 11/2018 | Turner et al. |
| 2019/0333548 A1 | 10/2019 | McGlaughlin et al. |

* cited by examiner

MEMORY TIERING USING PCIE CONNECTED FAR MEMORY

RELATED APPLICATIONS

This application is a continuation of U.S. patent application Ser. No. 16/539,139, filed Aug. 13, 2019, the entire contents of which are hereby incorporated by reference herein.

TECHNICAL FIELD

Embodiments of the disclosure relate generally to memory sub-systems, and more specifically, relate to memory tiering using PCIe connected far memory.

BACKGROUND

A memory sub-system can be a storage system, a memory module, such as a dual in-line memory module (DIMM), a small outline DIMM (SO-DIMM), or a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
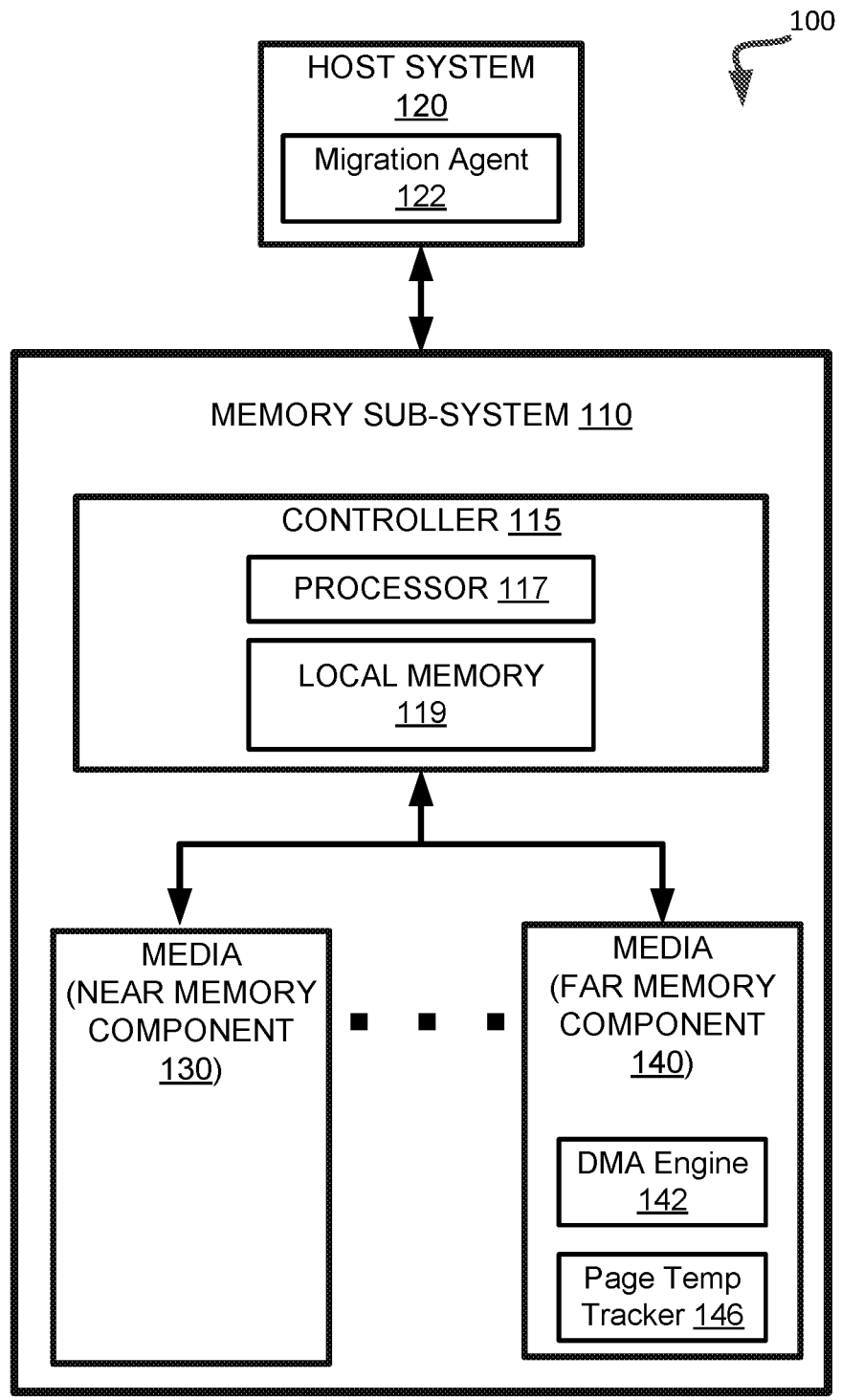
FIG. 1 illustrates an example computing environment that includes a memory sub-system in accordance with some embodiments of the present disclosure.

Aspects of the present disclosure are directed to memory tiering in a memory sub-system using peripheral component interconnect express (PCIe) connected far memory. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components. The host system can provide data to be stored at the memory sub-system and can request data to be retrieved from the memory sub-system.

A memory sub-system can include multiple memory components that can store data from the host system. Each memory component can include either the same or a different type of media. Examples of media include, but are not limited to, volatile dynamic random access memory (DRAM) or static random access memory (SRAM), a cross-point array of non-volatile memory, and flash based memory such as single-level cell (SLC) memory, multi-level cell (MLC) memory, triple-level cell (TLC) memory, or quad-level cell (QLC) memory. The characteristics of different types of media can vary from one media type to another. One example of a characteristic associated with a memory component is data density. Data density corresponds to an amount of data (e.g., bits of data) that can be stored in each memory cell of a memory component. Another example of a characteristic of a memory component is access speed. The access speed corresponds to an amount of time required to access data stored at the memory component. Other characteristics of a memory component can be associated with the endurance of the memory component to store data. When data is written to and/or erased from a memory cell of a memory component, the memory cell can be damaged. As the number of write operations and/or erase operations performed on a memory cell increases, the probability of the data stored at the memory cell including an error increases, and the memory cell is increasingly damaged.

In certain memory sub-systems, the storage media used as main memory may have certain disadvantages, such as having slower access times, thereby causing latencies when servicing data access requests. Accordingly, these memory sub-systems may implement a cache memory to temporarily store frequently accessed data using a different type of storage media. For example, the cache memory may be implemented using media with faster access times in order to reduce latencies associated with host data accesses. These memory systems that utilize two types of storage media may be referred to as "hybrid" memory systems. The hybridization of memory sub-systems using high-speed and expensive dynamic random access memory (DRAM), for example, as a cache memory for low-cost but slower cross-point array of non-volatile memory, for example, can allow the memory sub-system to have an increased memory capacity at a reduced cost per bit while still maintaining a desired level of performance (i.e., reduced latencies). The cross-point array of non-volatile memory may be formed using persistent memory devices that are typically addressable using data blocks of fixed size, which can be represented by virtual memory pages.

Conventional memory sub-systems that utilize this hybrid approach typically have to handle data accesses to the different memory components as well as the transfer of data between the different memory components. Certain systems utilize memory compression techniques that reduce the amount of physical memory space used to store a virtual memory page. The compressed data can be stored either in the cache memory (i.e., near memory) or the main memory (i.e., far memory) to increase the overall capacity in the memory sub-system. These compressed memory pages are marked as inaccessible so that attempts to access the compressed pages can trigger page faults. In response, the memory sub-system can retrieve the data from the far memory and decompress the data before providing it to the requestor. Accordingly, the system processor can suffer performance penalties due to the overhead associated with compression/decompression, handling page faults, etc., and additional latency is introduced impacting service to the host. Other conventional memory sub-systems may have both the near memory and the far memory connected to the processing device over a double date rate (DDR) bus. In this approach, memory bandwidth can be significantly penalized due to the relatively narrow bandwidth of the DDR bus, and page migrations between the near memory and the far memory can occur at the expense of processor and/or memory controller cycles. Certain solutions also require additional hardware components to avoid severe performance deficiencies.

Aspects of the present disclosure address the above and other deficiencies by implementing memory tiering in a memory sub-system using peripheral component interconnect express (PCIe) connected far memory. In one implementation, the memory sub-system includes a far memory component (i.e., a memory-mapped storage component), such as a cross-point array of non-volatile memory connected to a system processor and/or memory controller via a PCIe bus. Thus, the far memory can be accessed with a memory-mapped input/output (MMIO) addressing scheme using PCIe commands in known load/store semantics. In such an MMIO addressing scheme, both the far memory and a near memory (e.g., a DRAM device potentially used as a cache for the far memory) can share the same virtual address space. Thus, a memory access command issued by the processor, and specifying a particular data address, can be directed to either the near memory or the far memory in the memory sub-system. In addition, the PCIe connected far memory can include a direct memory access (DMA) engine to asynchronously move data to and from the near memory via a separate channel. For example, the DMA engine can request that cold pages (i.e., data that has been accessed infrequently or not recently) from the near memory be migrated to the far memory for long-term storage. Similarly, the DMA engine can transfer hot pages (i.e., data that has been accessed frequently or recently) from the far memory to the near memory. These direct migrations of data avoid tying up the system processor and other resources, which can instead be utilized for other operations. Furthermore, the memory sub-system can support native virtualization that allows different virtual machines in a host system to share a single PCIe interface with the memory sub-system. Thus, instead of a PCIe root complex in the host system performing virtualization, the memory sub-system itself can implement the virtualization without the need for a hypervisor or other software involvement from the host system. The host system interprets a number of physical functions as separate physical storage devices which can be assigned to the host operating system or to one of multiple virtual machines running thereon. In this manner, a single underlying storage resource can be shared by multiple entities on the host in a completely transparent fashion.

Since compression and decompression are not utilized in the disclosed memory tiering scheme, memory sub-system and host system performance are improved as processing device utilization overhead associated with such compression and decompression operations is avoided. In addition, since both near memory and far memory are directly addressable, the system does not experience page faults and the associated handling is avoided, thereby reducing latency associated with page migrations between near memory and far memory. Furthermore, by performing autonomic data temperature monitoring, the far memory prevents the system processor from having to perform software based page temperature tracking, which can be insufficiently granular and accurate in the first place.

FIG. 1 illustrates an example computing environment 100 that includes a memory sub-system 110 in accordance with some embodiments of the present disclosure. The memory sub-system 110 can include media, such as memory components 130 to 140. The memory components 130 to 1140 can be volatile memory components, non-volatile memory components, or a combination of such. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 130 to 140 when the memory sub-system 110 is coupled with the host system 120 by the PCIe interface. The physical host interface can provide an interface for passing control, address, data, and other signals between the memory sub-system 110 and the host system 120.

The memory components 130 to 140 can include any combination of the different types of non-volatile memory components and/or volatile memory components. For example memory component 130 may be used as a near memory based on dynamic random access memory (DRAM), or some other type of volatile memory. In one implementation, memory component 140 may be used as far memory based on a cross-point array of non-volatile memory cells, or some other type of non-volatile memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Another example of non-volatile memory components includes a negative-and (NAND) type flash memory. Each of the memory components can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components can be based on any other type of memory such as a volatile memory. In some embodiments, the memory components can be, but are not limited to, random access memory (RAM), read-only memory (ROM), synchronous dynamic random access memory (SDRAM), phase change memory (PCM), magneto random access memory (MRAM), negative-or (NOR) flash memory, or electrically erasable programmable read-only memory (EEPROM). Furthermore, the memory cells of the memory components 130 to 140 can be grouped as memory pages or data blocks that can refer to a unit of the memory component used to store data. The data blocks can be further grouped into one or more planes on each of memory components 130 to 140, where operations can be performed on each of the planes concurrently. Corresponding data blocks from different planes can be associated with one another in a stripe than spans across multiple planes.

The memory system controller 115 (hereinafter referred to as "controller") can communicate with the memory components 130 to 140 to perform operations such as reading data, writing data, or erasing data at the memory components and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, counters 118, etc. The local memory 119 can also include read-only memory (ROM) for storing microcode. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 130 to 140. The controller 115 can be responsible for other operations such as wear leveling operations, garbage collection operations, error detection and error-correcting code (ECC) operations, encryption operations, caching operations, and address translations between a logical block address and a physical block address that are associated with the memory components 130 to 140. The controller 115 can further include host interface circuitry to communicate with the host system 120 via the physical host interface. The host interface circuitry can convert the commands received from the host system into command instructions to access the memory components 130 to 140 as well as convert responses associated with the memory components 130 to 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 130 to 140.

In one implementation, far memory component 140 (and/or associated controller 115), is connected to the host system 120 via a PCIe bus. Thus, host system (and/or associated controller 115) can access far memory component 140 by sending data access commands directed to a host-addressable region of the far memory component 140 using a MMIO addressing scheme where the commands are specified using known load/store semantics. In another embodiment, the far memory component 140 can be accessed using a cache coherent interconnect for accelerators (CCIX). In such an MMIO (or CCIX) addressing scheme, both the near memory component 130 and the far memory component 140 can share the same virtual address space. Thus, a memory access command issued by host system 120, and specifying a particular data address, can be directed to either the near memory component 130 or the far memory component 140 in the memory sub-system 110. In addition, the PCIe connected far memory 140 can include DMA 142 engine to asynchronously move data to and from the near memory component 130 via a separate channel. For example, a migration agent 122 in host system can identify cold pages (i.e., data that has been accessed infrequently or not recently) on the near memory component 130 and can send a corresponding migration command to the DMA engine 142. The DMA engine 142 can initiate a DMA transfer of those cold pages from the near memory component 130 to the far memory component 140 for long-term storage. Similarly, a page temperature tracker 146 (e.g., implemented in firmware on the far memory component) can identify hot pages (i.e., data that has been accessed frequently or recently) on the far memory component 130 and can notify migration agent 122 of those hot pages. The migration agent 122 can send a corresponding migration command to the DMA engine 142, and the DMA engine 142 can initiate a DMA transfer of those hot pages from the far memory component 140 to the near memory component 130. These direct migrations of data avoid utilizing resources of the host system 120 and controller 115, which can instead be utilized for other operations at the same time. Further details with regards to the operations of the migration agent 122, DMA engine 142, and page temperature tracker 146 are described below.

Figure 2:
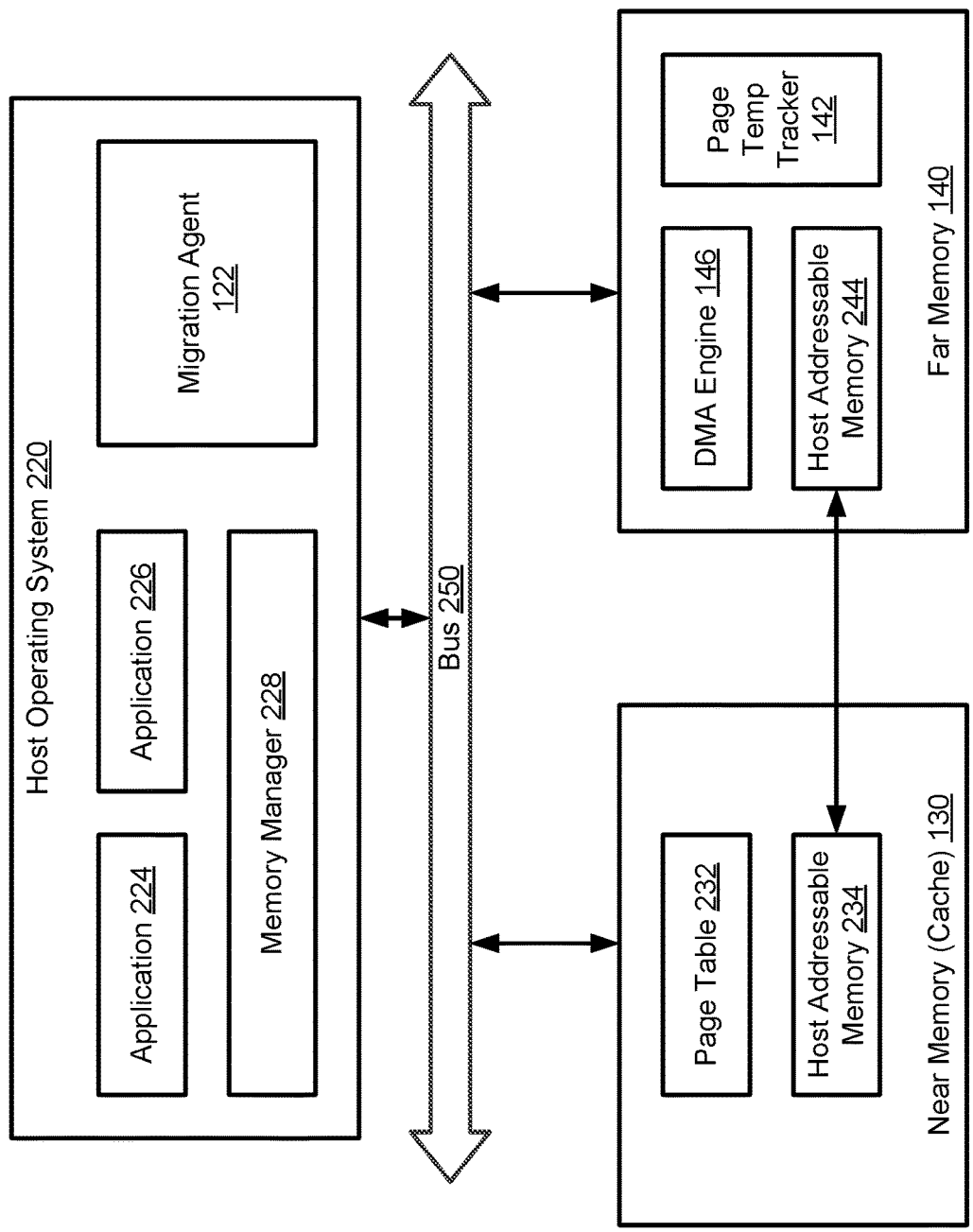
FIG. 2 is block diagram illustrating a memory-subsystem with a memory-mapped storage component accessible over a PCIe bus with DMA migration of data to a cache memory component in accordance with some embodiments of the present disclosure.

FIG. 2 is block diagram illustrating a memory-subsystem with a memory-mapped storage component 140 accessible over a PCIe bus with DMA migration of data to a cache memory component 130 in accordance with some embodiments of the present disclosure. In one implementation, host operating system 220 is operatively coupled with near memory 130 and far memory 140 over communications bus 250. As described above, near memory 130 may be implemented, for example, using DRAM to offer high performance and low latency to memory access requests made by applications 224, 226 or other components of host operating system 220 or host system 120. In one implementation, near memory 130 may serve as a cache, temporarily storing data, which can later be migrated to far memory 140 for long term storage. Far memory 140 can be, for example, a memory-mapped storage component implemented using a cross-point array of non-volatile memory. In one implementation, host addressable regions 234 and 244 of near memory 130 and far memory 140 may share a common address space, making far memory 140 addressable with data access commands specified using load/store semantics. In one implementation, communications bus 250 includes one or more separate physical busses used to transfer data and/or commands between host operating system 220, near memory 130, and far memory 140. For example, communications bus 250 may include a DDR bus, a PCIe bus, an NVMe bus, or a combination of these and/or other busses. In one implementation, host operating system 220 is operatively coupled with near memory 130 over a DDR bus and host operating system 220 is operatively coupled with far memory 140 over a PCIe bus.

In one implementation a host operating system 220 runs on a computing device, such as host system 120. The host operating system 220 can include a number of components, such as migration agent 122, applications 224, 226, and memory manager 228. These and other components of host operating system 220 which are not shown so as not to obscure the present disclosure, may be executed by a processing device, such as a central processing unit (CPU) of the host system 120. As part of their normal operations applications 224, 226 may request memory space in the memory sub-system including near memory 130 (i.e., cache memory) and far memory 140 (i.e., memory-mapped storage). In response to such a request, memory manager 228 may allocate a corresponding address space in the near memory 130. This allocated address space can be represented as one or more memory pages.

Memory manager 228 can further store an indication of the one or more memory pages in page table 232. In one implementation, page table 232 is stored in near memory 130 and controlled by memory manager 228. Page table 232 may include a data structure storing a mapping between virtual memory addresses used by host operating system 220 and physical memory addresses where the memory pages are stored in near memory 130 and far memory 140. For example, page table 232 may include an entry corresponding to each memory page which includes a virtual memory address and a physical memory address for that memory page. Since both near memory 130 and far memory 140 share a single address space (i.e., host addressable memory regions 234 and 244, respectively), physical memory addresses in far memory 140 can also be represented in page table 232. In one implementation, page table 232 further stores additional metadata corresponding to each memory page mapped to a physical memory address in near memory 130, such as a number of data accesses, a frequency of data accesses or a most recent data access of the memory page. The memory pages mapped to a physical memory address in far memory 140 may not have such metadata stored in page table 232. Memory manager 228 may add an entry to page table 228 when a new page is allocated in near memory 130 and may update that entry when the memory page is migrated to far memory 140 or back to near memory 130, as described in more detail below. In addition, upon initialization of host operating system 220 or connection to far memory 140, memory manager 228 may receive a message from far memory 140 advertising the physical address range of host-addressable memory region 244. Memory manager 228 can maintain an indication of this physical address range in the page table 232.

In one implementation, migration agent 122 can monitor a data temperature of memory pages stored in host-addressable memory region 234 of near memory 130. The data temperature can be measured according to any of a number of parameters. The parameters can includes for example, a number of data accesses, a frequency of data accesses, or a recency of data accesses directed to a given memory page. Thus, in one implementation, migration agent 122 can increment a counter each time a given memory page is accessed (e.g., read from or written to) by one of applications 224, 226. In another implementation, migration agent 122 can determine how many of those data accesses occurred in a given period of time (e.g., the last minute, the last hour, the last 24 hours). In another implementation, migration agent 122 can maintain a timestamp or other value indicating when a most recent data access occurred or how much time has passed since a most recent data access of a given memory page. In one implementation, the data temperature can be measured using a combination of two or more of these or other parameters.

In one implementation, migration agent 122 determines whether a given memory page satisfies a threshold criterion pertaining to the data temperature of the memory page. For example, migration agent 122 may periodically compare the determined data temperature of the memory page to one or more thresholds corresponding to the various parameters described above. If migration agent 122 determines that the number of data accesses or the number of data accesses in a given time period is below (or equal to) a certain threshold, or that the time elapsed since a most recent data access is above (or equal to) a certain threshold, migration agent 122 may determine that the given memory page satisfies the threshold criterion. Such a memory page may be considered to be "cold" and not expected to be accessed again by the applications 224, 226 in the near future. In one implementation, migration agent 122 may send a corresponding migration command indicating the cold memory page to the DMA engine 146 on far memory 140. This migration command may cause the DMA engine 146 to initiate a DMA transfer of the cold memory page from near memory 130 to the host-addressable memory region 244 of far memory 140. Migration agent 122 may further notify memory manager 228 of the migration and cause memory manager 228 to update the entry corresponding to the cold memory page in page table 232 with a new physical address where the cold memory page is stored in the host-addressable memory region 244 of far memory 140. Migration agent 122 may periodically perform a similar analysis for each memory page mapped to near memory 130 and send corresponding migration commands as appropriate. If migration agent 122 determines that a given memory page does not satisfy the threshold criterion (i.e., the memory page is "hot" and is expected to be accessed again by the applications 224, 226 in the near future), migration agent 122 may maintain the memory page in the host-addressable memory region 234 of near memory 130.

In one implementation, far memory 140 includes a page temperature tracker component which monitors a data temperature of memory pages stored in host-addressable memory region 244 of far memory 140. The data temperature can be measured according to any of the same parameters described above or using a combination of two or more of these or other parameters. In one implementation, page temperature tracker 142 determines whether a given memory page satisfies a threshold criterion pertaining to the data temperature of the memory page. For example, page temperature tracker 142 may periodically compare the determined data temperature of the memory page to one or more thresholds corresponding to the various parameters described above. If page temperature tracker 142 determines that the number of data accesses or the number of data accesses in a given time period exceeds (or is equal to) a certain threshold, or that the time elapsed since a most recent data access is below (or equal to) a certain threshold, page temperature tracker 142 may determine that the given memory page satisfies the threshold criterion. Such a memory page may be considered to be "hot" and is expected to be accessed again by the applications 224, 226 in the near future. In one implementation, page temperature tracker 142 send an indication of the hot memory page to migration agent 122 in host operation system 220. In response, migration agent 122 can send a corresponding migration command indicating the hot memory page to the DMA engine 146 on far memory 140. This migration command can cause the DMA engine 146 to initiate a DMA transfer of the hot memory page from far memory 140 to the host-addressable memory region 234 of near memory 130. Migration agent 122 may further notify memory manager 228 of the migration and cause memory manager 228 to update the entry corresponding to the hot memory page in page table 232 with a new physical address where the hot memory page is stored in the host-addressable memory region 234 of near memory 130. Page temperature tracker 142 may periodically perform a similar analysis for each memory page mapped to far memory 140 and send corresponding indication to migration agent 122 as appropriate. If page temperature tracker 142 determines that a given memory page does not satisfy the threshold criterion (i.e., the memory page is "cold" and is not expected to be accessed again by the applications 224, 226 in the near future), page temperature tracker 142 may maintain the memory page in the host-addressable memory region 244 of far memory 140.

Figure 3:
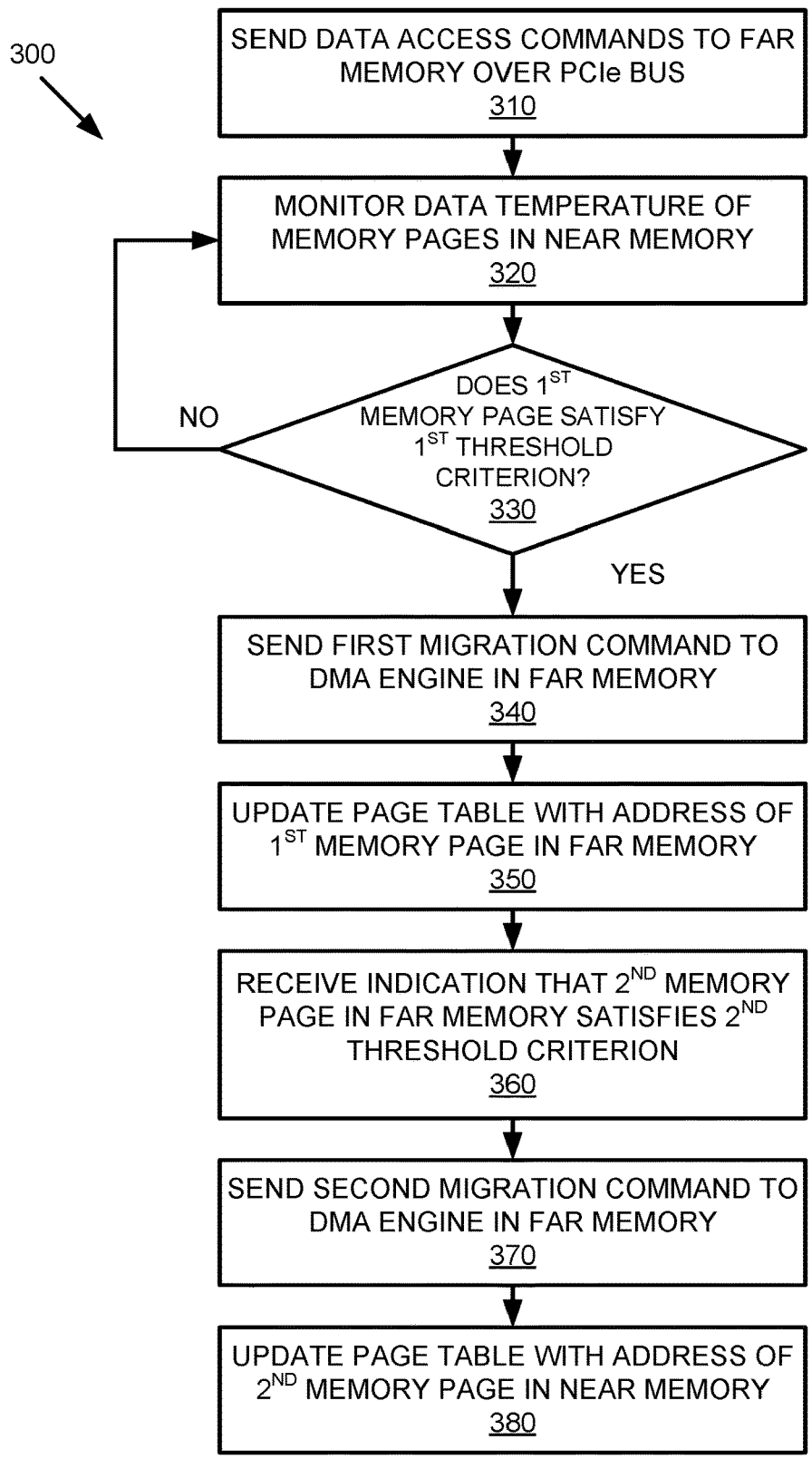
FIG. 3 is a flow diagram of an example method of host-side memory tiering using PCIe connected far memory in accordance with some embodiments of the present disclosure.

FIG. 3 is a flow diagram of an example method of host-side memory tiering using PCIe connected far memory in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), firmware, or a combination thereof. In some embodiments, the method 300 is performed by the migration agent 122 and memory manager 228 of FIGS. 1 and 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic sends data access commands directed to a host-addressable region 244 of a memory-mapped storage component (i.e., far memory 140) over the PCIe bus 250. In one implementation, host addressable regions 234 and 244 of a cache memory component (i.e., near memory 130) and the memory-mapped storage component (i.e., far memory 140) may share a common address space, making memory-mapped storage component addressable with data access commands specified using load/store semantics. The data access commands can be issued for example, by applications 224, 226 or other components of host operating system 220 or host system 120, and can include read requests, write requests, or other requests.

At operation 320, the processing logic monitors a data temperature of a plurality of memory pages stored in a host-addressable region 234 of the cache memory component (i.e., near memory 130). In one implementation, migration agent 122 can monitor the data temperature according to any of a number of parameters, such as a number of data accesses, a frequency of data accesses, or a recency of data accesses directed to a given memory page. Thus, in one implementation, migration agent 122 can increment a counter each time a given memory page is accessed (e.g., read from or written to) by one of applications 224, 226. In another implementation, migration agent 122 can determine how many of those data accesses occurred in a given period of time (e.g., the last minute, the last hour, the last 24 hours). In another implementation, migration agent 122 can maintain a timestamp or other value indicating when a most recent data access occurred or how much time has passed since a most recent data access of a given memory page. In one implementation, the data temperature can be measured using a combination of two or more of these or other parameters.

At operation 330, the processing logic determines whether a first memory page of the plurality of memory pages satisfies a first threshold criterion pertaining to the data temperature of the first memory page. In one implementation, migration agent 122 can periodically compare the determined data temperature of the first memory page to one or more thresholds corresponding to the various parameters described above. If migration agent 122 determines that the number of data accesses or the number of data accesses in a given time period is below (or equal to) a certain threshold, or that the time elapsed since a most recent data access is above (or equal to) a certain threshold, migration agent 122 may determine that the given memory page satisfies the threshold criterion. Such a memory page may be considered to be "cold" and not expected to be accessed again by the applications 224, 226 in the near future. If the first memory page does not satisfy the first threshold criterion, the processing logic returns to operation 320 to continue monitoring the data temperature of the memory pages.

If the first memory page satisfies the first threshold criterion, at operation 340, the processing logic sends a first migration command indicating the first memory page to a DMA engine 146 executing on the memory-mapped storage component (i.e., far memory 140). In one implementation, the first migration command causes the DMA engine 146 to initiate a first DMA transfer of the first memory page from the cache memory component (i.e., near memory 130) to a host-addressable region 244 of the memory-mapped storage component. At operation 350, the processing logic updates a page table 232 maintained in the cache memory component (i.e., near memory 130) to indicate an address where the first memory page is stored in the host-addressable region 244 of the memory-mapped storage component (i.e., far memory 140).

At operation 360, the processing logic receives, from the memory-mapped storage component (i.e., far memory 140), an indication that a second memory page stored in the host-addressable region 244 of the memory-mapped storage component satisfies a second threshold criterion pertaining to the data temperature of the second memory page. In one implementation, migration agent 122 receives the indication from page temperature tracker 142 of the memory-mapped storage component.

At operation 370, the processing logic sends a second migration command indicating the second memory page to the DMA engine 146 executing on the memory-mapped storage component (i.e., far memory 140). In one implementation, the second migration command causes the DMA engine 146 to initiate a second DMA transfer of the second memory page from the host-addressable region 244 of the memory-mapped storage component to the cache memory component (i.e., near memory 130). At operation 380, the processing logic updates a page table 232 maintained in the cache memory component (i.e., near memory 130) to indicate an address where the second memory page is stored in the host-addressable region 234 of the cache memory component.

Figure 4:
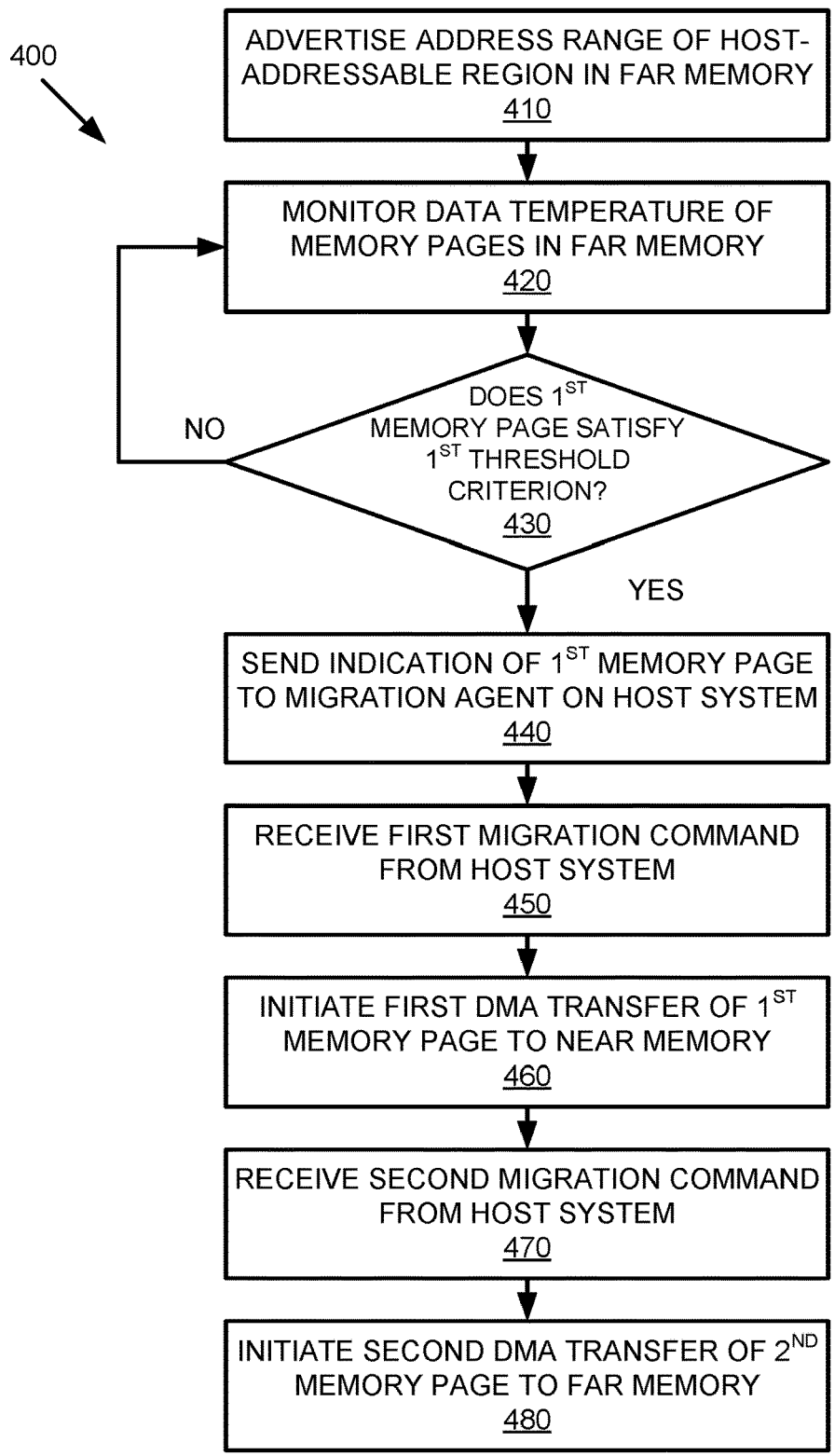
FIG. 4 is a flow diagram of an example method of memory-side memory tiering using PCIe connected far memory in accordance with some embodiments of the present disclosure.

FIG. 4 is a flow diagram of an example method of memory-side memory tiering using PCIe connected far memory in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), firmware, or a combination thereof. In some embodiments, the method 300 is performed by the page temperature tracker 142 and DMA engine 146 of FIGS. 1 and 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic advertises an address range representing the host-addressable region 244 of the memory-mapped storage device (i.e., far memory 140) to the host system 120. In one implementation, the host system 120 maintains an indication of the host-addressable region 244 of the memory-mapped storage device in a page table 232 stored in the cache memory device (i.e., near memory 130).

At operation 420, the processing logic monitors a data temperature of a plurality of memory pages stored in a host-addressable region 244 of the memory-mapped storage device (i.e., far memory 140). In one implementation, the memory-mapped storage device includes a page temperature tracker component 142 which monitors a data temperature of memory pages stored in host-addressable memory region 244 of the memory-mapped storage device according to any of a number of parameters, such as a number of data accesses, a frequency of data accesses, or a recency of data accesses directed to a given memory page. Thus, in one implementation, temperature tracker 142 can increment a counter each time a given memory page is accessed (e.g., read from or written to) by one of applications 224, 226. In another implementation, migration agent 122 can determine how many of those data accesses occurred in a given period of time (e.g., the last minute, the last hour, the last 24 hours). In another implementation, migration agent 122 can maintain a timestamp or other value indicating when a most recent data access occurred or how much time has passed since a most recent data access of a given memory page. In one implementation, the data temperature can be measured using a combination of two or more of these or other parameters.

At operation 430, the processing logic determines whether a first memory page of the plurality of memory pages satisfies a first threshold criterion pertaining to the data temperature of the first memory page. In one implementation, page temperature tracker 142 determines whether a given memory page satisfies a threshold criterion pertaining to the data temperature of the memory page. For example, page temperature tracker 142 may periodically compare the determined data temperature of the memory page to one or more thresholds corresponding to the various parameters described above. If page temperature tracker 142 determines that the number of data accesses or the number of data accesses in a given time period exceeds (or is equal to) a certain threshold, or that the time elapsed since a most recent data access is below (or equal to) a certain threshold, page temperature tracker 142 may determine that the given memory page satisfies the threshold criterion. Such a memory page may be considered to be "hot" and is expected to be accessed again by the applications 224, 226 in the near future. If the first memory page does not satisfy the first threshold criterion, the processing logic returns to operation 420 to continue monitoring the data temperature of the memory pages.

If the first memory page satisfies the first threshold criterion, at operation 440, the processing logic sends an indication of the first memory page satisfying the first threshold criterion to a migration agent 122 executing on the host system 120. At operation 450, the processing logic receives a first migration command from the migration agent 122 executing on the host system 120, the first migration command indicating the first memory page. At operation 460, responsive to receiving the first migration command, the processing logic initiates a first DMA transfer of the first memory page from the memory-mapped storage device (i.e., far memory 140) to the cache memory device (i.e., near memory 130) operatively coupled with the host system 120.

At operation 470, the processing logic receives a second migration command from the migration agent 122 executing on the host system 120, the second migration command indicating a second memory page stored in a host-addressable region 234 of the cache memory device (i.e., near memory 130). In one implementation, DMA engine 146 of the memory-mapped storage device (i.e., far memory 140) receives the second migration command from migration agent 122. At operation 480, responsive to receiving the second migration command, the processing logic initiates a second DMA transfer of the second memory page from the cache memory device to the host-addressable region 244 of the memory-mapped storage device.

Figure 5:
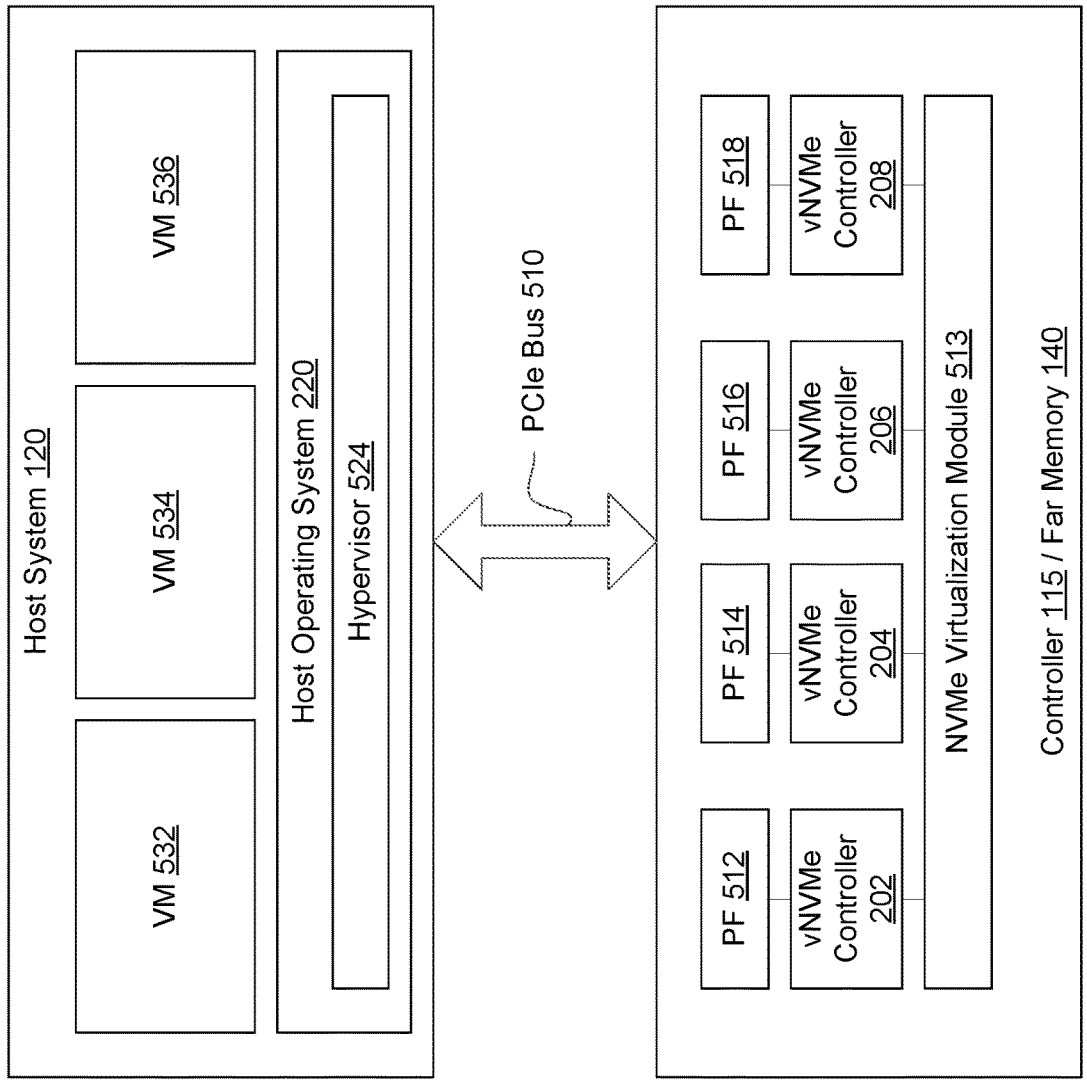
FIG. 5 is a block diagram illustrating an example physical host interface between a host system and a memory sub-system implementing NVMe direct virtualization for PCIe connected far memory in accordance with some embodiments of the present disclosure.

FIG. 5 illustrates an example physical host interface between a host system 120 and a memory sub-system implementing NVMe direct virtualization for PCIe connected far memory in accordance with some embodiments of the present disclosure. In one embodiment, the controller 115 of memory sub-system 110 is connected to host system 120 over a physical host interface, such as PCIe bus 510. In one embodiment, an NVMe virtualization module 513 running on controller 115 generates and manages a number of virtual NVMe controllers 502-508 within controller 115 (or directly within far memory 140). The virtual NVMe controllers 502-508 are virtual entities that appear as physical controllers to other devices, such as host system 120, connected to PCIe bus 510 by virtue of a physical function 512-518 associated with each virtual NVMe controller 502-508. FIG. 5 illustrates four virtual NVMe controllers 502-508 and four corresponding physical functions 512-518. In other embodiments, however, there may be any other number of NVMe controllers, each having a corresponding physical function. All of the virtual NVMe controllers 502-508 have the same priority and same functionality.

Each of virtual NVMe controllers 502-508 manages storage access operations for the corresponding portion of the underlying far memory component 140, with which it is associated. For example, virtual NVMe controller 502 may receive data access requests from host system 120 over PCIe bus 510, including requests to read, write, or erase data in a first portion of far memory component 140. In response to the request, virtual NVMe controller 502 may perform the requested memory access operation on the data stored at an identified address in the first portion and return requested data and/or a confirmation or error message to the host system 120, as appropriate. Virtual NVMe controllers 504-508 may function in the same or similar fashion with respect to data access requests for their own corresponding portions of far memory component 140.

As described above, NVMe virtualization module 513 associates one of physical functions 512-518 with each of virtual NVMe controllers 502-508 in order to allow each virtual NVMe controller 502-508 to appear as a physical controller on PCIe bus 510. For example, physical function 512 may correspond to virtual NVMe controller 502, physical function 514 may correspond to virtual NVMe controller 504, physical function 516 may correspond to virtual NVMe controller 506, and physical function 518 may correspond to virtual NVMe controller 508. Physical functions 512-518 are fully featured PCIe functions that can be discovered, managed, and manipulated like any other PCIe device, and thus can be used to configure and control a PCIe device (e.g., virtual NVMe controllers 502-508). Each physical function 512-518 can have some number virtual functions associated with therewith. The virtual functions are lightweight PCIe functions that share one or more resources with the physical function and with virtual functions that are associated with that physical function. Each virtual function has a PCI memory space, which is used to map its register set. The virtual function device drivers operate on the register set to enable its functionality and the virtual function appears as an actual PCIe device, accessible by host system 120 over PCIe bus 510.

As noted above, each physical function 512-518 can be assigned to any one of virtual machines 532-536 in the host system 120. When I/O data is received at a virtual NVMe controller 502-508 from a virtual machine 532-536, a virtual machine driver provides a guest physical address for a corresponding read/write command. NVMe virtualization module 113 translates the physical function number to a bus, device, and function (BDF) number and then adds the command to a direct memory access (DMA) operation to perform the DMA operation on the guest physical address. In one embodiment, controller 115 further transforms the guest physical address to a system physical address for the memory sub-system 110.

Furthermore, each physical function 512-518 may be implemented in either a privileged mode or normal mode. When implemented in the privileged mode, the physical function has a single point of management that can control resource manipulation and storage provisioning for other functions implemented in the normal mode. In addition, a physical function in the privileged mode can perform management options, including for example, enabling/disabling of multiple physical functions, storage and quality of service (QoS) provisioning, firmware and controller updates, vendor unique statistics and events, diagnostics, secure erase/encryption, among others. Typically, a first physical function can implement a privileged mode and the remainder of the physical functions can implement a normal mode. In other embodiments, however, any of the physical functions can be configured to operate in the privileged mode. Accordingly, there can be one or more functions that run in the privileged mode.

Host system 120 runs multiple virtual machines 532, 534, 536, by executing a software layer 524, often referred to as "hypervisor," above the hardware and below the virtual machines, as schematically shown in FIG. 5. In one illustrative example, the hypervisor 524 may be a component of a host operating system 220 executed by the host system 120. Alternatively, the hypervisor 524 may be provided by an application running under the host operating system 220, or may run directly on the host system 120 without an operating system beneath it. The hypervisor 524 may abstract the physical layer, including processors, memory, and I/O devices, and present this abstraction to virtual machines 532, 534, 536 as virtual devices, including virtual processors, virtual memory, and virtual I/O devices. Virtual machines 532, 534, 536 may each execute a guest operating system which may utilize the underlying virtual devices, which may, for example, map to a portion of the far memory components 140 managed by one of virtual NVMe controllers 502-508 in memory sub-system 110. One or more applications may be running on each virtual machine under the guest operating system.

Each virtual machine 532, 534, 536 may include one or more virtual processors. Processor virtualization may be implemented by the hypervisor 524 scheduling time slots on one or more physical processors such that from the guest operating system's perspective, those time slots are scheduled on a virtual processor. Memory virtualization may be implemented by a page table (PT) which is a memory structure translating guest memory addresses to physical memory addresses. The hypervisor 524 may run at a higher privilege level than the guest operating systems, and the latter may run at a higher privilege level than the guest applications.

In one implementation, there may be multiple partitions on host system 120 representing virtual machines 532, 534, 536. A parent partition corresponding to virtual machine 532 is the root partition (i.e., root ring 0) that has additional privileges to control the life cycle of other child partitions (i.e., conventional ring 0), corresponding, for example, to virtual machines 534 and 536. Each partition has corresponding virtual memory, and instead of presenting a virtual device, the child partitions see a physical device being assigned to them. When host system 120 initially boots up, the parent partition can see all of the physical devices directly. The pass through mechanism (e.g., PCIe Pass-Through or Direct Device Assignment) allows the parent partition to assign an NVMe device (e.g., one of virtual NVMe controllers 502-508) to the child partitions. The associated virtual NVMe controllers 502-508 may appear as a virtual storage resource to each of virtual machines 532, 534, 536, which the guest operating system or guest applications running therein can access. In one embodiment, for example, virtual machine 532 is associated with virtual NVMe controller 502, virtual machine 534 is associated with virtual NVMe controller 504, and virtual machine 536 is associated with virtual NVMe controller 506. In other embodiments, one virtual machine may be associated with two or more virtual NVMe controllers. The virtual machines 532, 534, 536, can identify the associated virtual NVMe controllers using a corresponding bus, device, and function (BDF) number, as will be described in more detail below.

In one embodiment, NVMe virtualization module 113 further implements access control services for each of virtual NVMe controllers 502-508. The access control services manage what devices have access permissions for the virtual NVMe controllers 502-508. The access permissions may define, for example, which of virtual machines 532-536 on host system 120 can access each of virtual NVMe controllers 502-508, as well as what operations each of virtual machines 532-536 can perform on each of virtual NVMe controllers 502-508. In one embodiment, NVMe virtualization module 113 controls access permissions for each of virtual NVMe controllers 502-508 individually. For example, in the privileged mode, NVMe virtualization module 513 may grant virtual machine 532 permission to read and write data using virtual NVMe controller 502, but only permission to read data using virtual NVMe controller 504. Similarly, in the privileged mode, NVMe virtualization module 113 may grant virtual machine 532 permission to read and write data using virtual NVMe controller 504 only. Any combination of access permissions may be defined for virtual NVMe controllers 502. When a memory access request is received for one of virtual NVMe controllers 502-508, NVMe virtualization module 113 may analyze the conditions of the request (e.g., requestor, target, operation, requested data address, etc.) based on access policies defining the access control services. The access policies may be stored in local memory 119, for example. If the request satisfies the corresponding access policy (the conditions of the request match conditions specified in the corresponding access policy), NVMe virtualization module 113 may grant the access request. Otherwise, the request may be denied.

Figure 6:
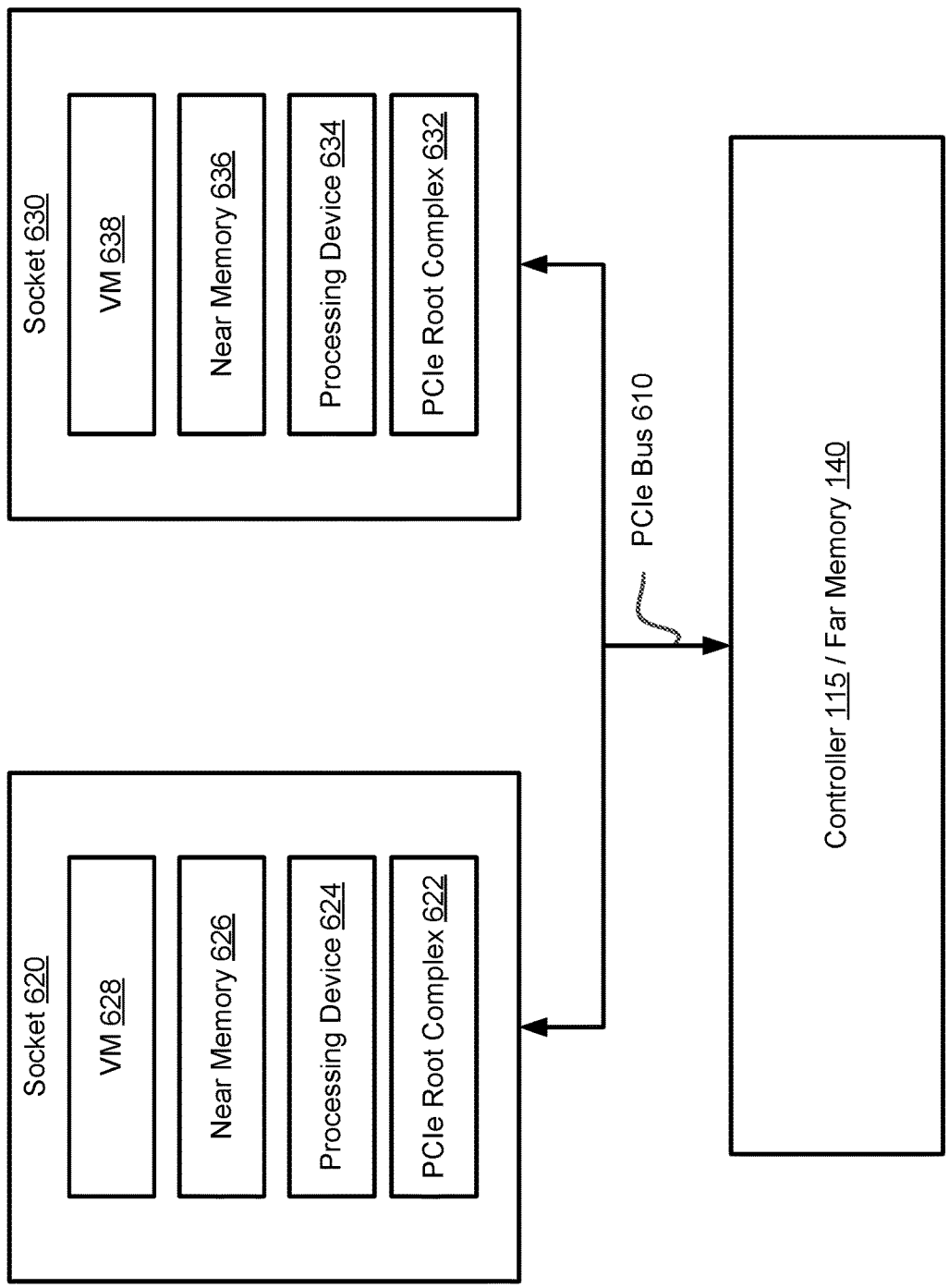
FIG. 6 illustrates a socket hierarchy and topology for a memory sub-system with PCIe connected far memory in accordance with some embodiments of the present disclosure.

FIG. 6 illustrates a socket hierarchy and topology for a memory sub-system with PCIe connected far memory in accordance with some embodiments of the present disclosure. In one embodiment, host system 120 includes a number of sockets 620 and 630 each including a separate PCIe root complex 622 and 632, which serve as a connection between the physical and virtual components of the corresponding socket and the PCIe bus 610. PCIe root complexes 622 and 632 can generate transaction requests on behalf of a processing device 624 or 634 or a virtual processing device in one of virtual machines 628 or 638. Depending on the embodiment, PCIe root complexes 622 and 632 may be implemented as a discrete devices or may be integrated with one of physical processing devices 624 or 634. PCIe root complexes 622 and 632 may each have a number of communication ports such that PCIe root complexes 622 and 632 can send and receive commands to/from multiple PCIe devices, such as virtual NVMe controllers in controller 115 or far memory 140 connected to PCIe bus 610. Each of sockets 620 and 630 may further include an instance of near memory 626 and 636.

Figure 7:
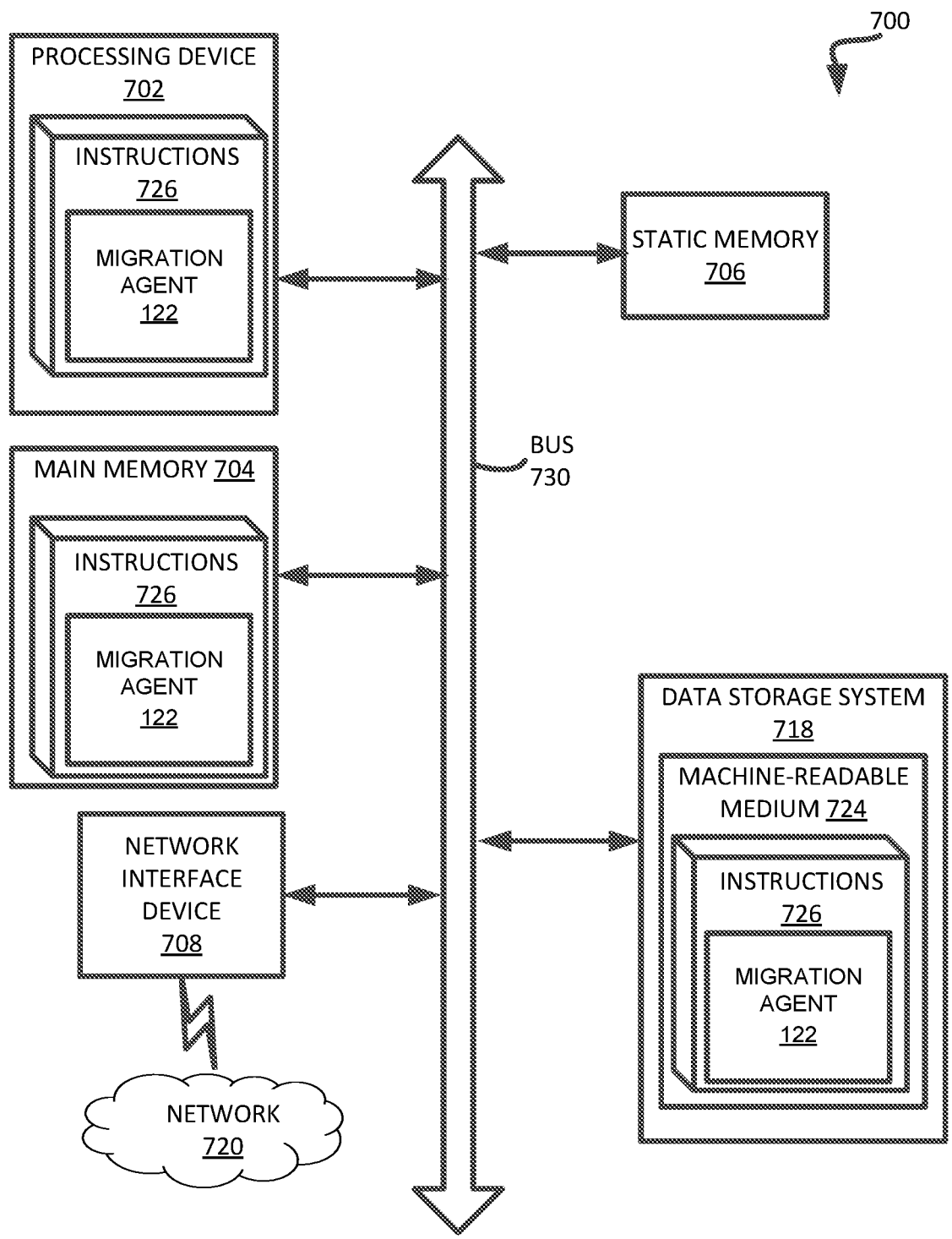
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to the migration agent 122 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
 a first memory device;
 a cache memory device; and
 a processing device, operatively coupled with the first memory device and with the cache memory device, to perform operations comprising:
  determining that a value representing an access pattern of a first segment of the first memory device is greater than or equal to a first threshold value;
  sending an indication of the first segment having the value representing the access pattern being greater than or equal to the first threshold value to a migration agent executing on a host system coupled to the first memory device via-a peripheral component interconnect express (PCIe) bus;
  receiving, via the PCIe bus, a first migration command from the migration agent executing on the host system, the first migration command indicating the first segment; and
  responsive to receiving the first migration command, initiating a first direct memory access (DMA) transfer, via a channel separate from the PCIe bus, of the first segment from the first memory device to the cache memory device.

2. The system of claim 1, wherein determining that the value representing the access pattern of the first segment of the first memory device is greater than or equal to the first threshold value comprises determining that at least one of a number of data accesses, a frequency of data accesses, or a recency of data accesses directed to the first segment exceeds the first threshold value.

3. The system of claim 1, wherein the processing device is to perform operations further comprising:
 receiving a second migration command from the migration agent executing on the host system, the second migration command indicating a second segment stored in a host-addressable region of the cache memory device.

4. The system of claim 3, wherein the processing device is to perform operations further comprising:
 responsive to receiving the second migration command, initiating a second DMA transfer of the second segment from the cache memory device to a host-addressable region of the first memory device.

5. The system of claim 4, wherein the second segment satisfies a second threshold criterion pertaining to the access pattern of the second segment.

6. The system of claim 5, wherein the second segment satisfies the second threshold criterion when at least one a number of data accesses, a frequency of data accesses, or a recency of data accesses directed to the second segment is below a second threshold.

7. The system of claim 1, wherein the processing device is to perform operations further comprising:
advertising an address range representing a host-addressable region of the first memory device to the host system, wherein the host system is to maintain an indication of the host-addressable region of the first memory device in a page table stored in the cache memory device.

8. A method of operation of a memory sub-system comprising:
determining that a value representing an access pattern of a first segment of a first memory device is greater than or equal to a first threshold value;
sending an indication of the first segment having the value representing the access pattern being greater than or equal to the first threshold value to a migration agent executing on a host system coupled to the first memory device via a peripheral component interconnect express (PCIe) bus;
receiving, via the PCIe bus, a first migration command from the migration agent executing on the host system, the first migration command indicating the first segment; and
responsive to receiving the first migration command, initiating a first direct memory access (DMA) transfer, via a channel separate from the PCIe bus, of the first segment from the first memory device to a cache memory device operatively coupled with the host system.

9. The method of claim 8, wherein determining that the value representing the access pattern of the first segment of the first memory device is greater than or equal to the first threshold value comprises determining that at least one of a number of data accesses, a frequency of data accesses, or a recency of data accesses directed to the first segment exceeds the first threshold value.

10. The method of claim 8, further comprising:
receiving a second migration command from the migration agent executing on the host system, the second migration command indicating a second segment stored in a host-addressable region of the cache memory device.

11. The method of claim 10, further comprising:
responsive to receiving the second migration command, initiating a second DMA transfer of the second segment from the cache memory device to a host-addressable region of the first memory device.

12. The method of claim 11, wherein the second segment satisfies a second threshold criterion pertaining to the access pattern of the second segment.

13. The method of claim 12, wherein the second segment satisfies the second threshold criterion when at least one a number of data accesses, a frequency of data accesses, or a recency of data accesses directed to the second segment is below a second threshold.

14. The method of claim 8, further comprising:
advertising an address range representing a host-addressable region of the first memory device to the host system, wherein the host system is to maintain an indication of the host-addressable region of the first memory device in a page table stored in the cache memory device.

15. A non-transitory computer-readable storage medium comprising instructions that, when executed by a processing device, cause the processing device to:
determining that a value representing an access pattern of a first segment of a first memory device is greater than or equal to a first threshold value;
sending an indication of the first segment having the value representing the access pattern being greater than or equal to the first threshold value to a migration agent executing on a host system coupled to the first memory device via a peripheral component interconnect express (PCIe) bus;
receiving, via the PCIe bus, a first migration command from the migration agent executing on the host system, the first migration command indicating the first segment; and
responsive to receiving the first migration command, initiating a first direct memory access (DMA) transfer, via a channel separate from the PCIe bus, of the first segment from the first memory device to a cache memory device operatively coupled with the host system.

16. The non-transitory computer-readable storage medium of claim 15, wherein determining that the value representing the access pattern of the first segment of the first memory device is greater than or equal to the first threshold value comprises determining that at least one of a number of data accesses, a frequency of data accesses, or a recency of data accesses directed to the first segment exceeds the first threshold value.

17. The non-transitory computer-readable storage medium of claim 15, wherein the instructions cause the processing device to perform operations further comprising:
receiving a second migration command from the migration agent executing on the host system, the second migration command indicating a second segment stored in a host-addressable region of the cache memory device; and
responsive to receiving the second migration command, initiating a second DMA transfer of the second segment from the cache memory device to a host-addressable region of the first memory device.

18. The non-transitory computer-readable storage of claim 17, wherein the second segment satisfies a second threshold criterion pertaining to the access pattern of the second segment.

19. The non-transitory computer-readable storage of claim 18, wherein the second segment satisfies the second threshold criterion when at least one a number of data accesses, a frequency of data accesses, or a recency of data accesses directed to the second segment is below a second threshold.

20. The non-transitory computer-readable storage medium of claim 15, wherein the instructions cause the processing device to perform operations further comprising:
advertising an address range representing a host-addressable region of the first memory device to the host system, wherein the host system is to maintain an indication of the host-addressable region of the first memory device in a page table stored in the cache memory device.

\* \* \* \* \*